Nov. 12, 1963  W. V. CHUMAKOV  3,110,855
POLARITY SENSITIVE FUSE
Filed June 28, 1960  2 Sheets-Sheet 1

INVENTOR.
WALTER V. CHUMAKOV
BY
OSTROLENK, FABER, GERB & SOFFEN
ATTORNEYS

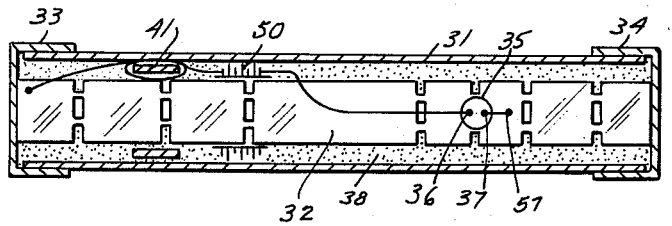
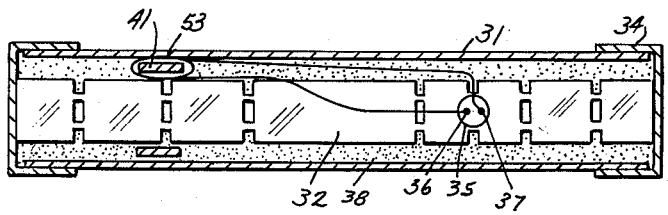
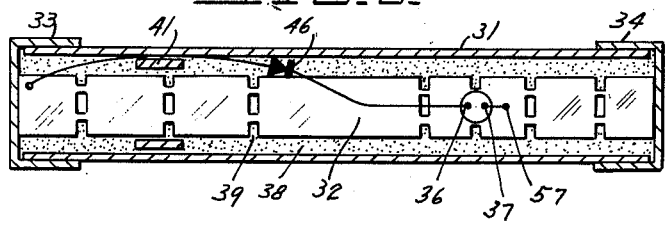
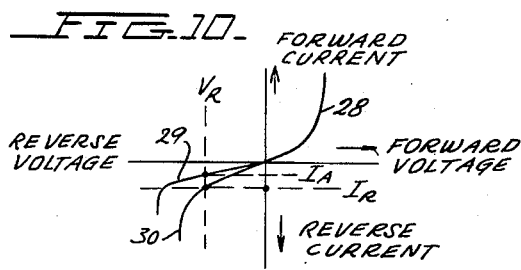
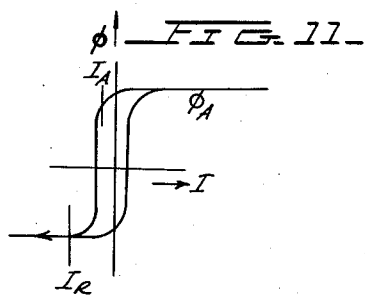
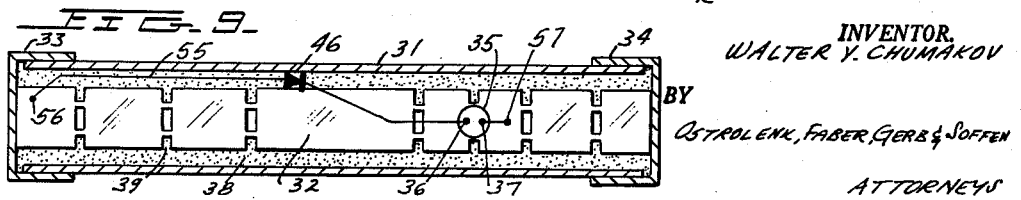

3,110,855
POLARITY SENSITIVE FUSE
Walter V. Chumakov, Philadelphia, Pa., assignor to I-T-E Circuit Breaker Company, Philadelphia, Pa., a corporation of Pennsylvania
Filed July 28, 1960, Ser. No. 45,877
6 Claims. (Cl. 321—12)

My invention relates to fuses, and more specifically relates to fuses having different characteristics of operation depending upon the direction of current through the fuse.

Presently existing fuse devices are symmetrical and operate responsive to the heating of the fuse element, regardless of the direction of current which causes this heat.

In accordance with the present invention, a novel fuse device is provided particularly for unidirectional current circuits where the fuse has a predetermined characteristic set in the normal manner for forward currents, while a high speed fuse operation is provided for reverse currents. In one embodiment of the invention an explosive cap is operatively connected to the fuse link of the fuse. This explosive cap is energized from a circuit driven by the current through the fuse link which fires the cap when a change in direction of current flow occurs to thereby cause interruption of the link and operation of the fuse.

The invention has particular application in the protection of rectifier cells wherein a plurality of parallel connected rectifier cells are each provided with a respective fuse element. In the past, in such systems, when a rectifier cell fails, and conducts substantial current in the reverse direction, the conduction of current in both forward and reverse direction will cause appropriate heating of the fuse to cause its operation, and thus remove the faulty cell from the circuit. As an illustration, with a normal fuse connected in series with a cell and rated at 250 amperes, it has been found that the reverse current must reach 5,000 amperes, for example, before the fuse will operate. This surge of reverse current can, of course, cause adverse effects on the circuit and damage various components thereof, and in addition, can cause an undesired removal of the unit from the line even though only a single cell fails.

In accordance with the present invention, circuitry is provided which is responsive to reverse current through the fuse which need be of a value only sufficient to indicate that the series connected cell is faulty, whereby an explosive cap is detonated to cause fuse operation. It will be noted that this concept can be extended to a symmetric circuit where a sufficient voltage will be generated to operate the explosive cap when a predetermined rate of rise of current is available in either direction of current change. The fuse can also be used for protection of other unidirectional current circuits like D.-C. tie circuits, D.-C. feeders or rectifier units, if it is desired to interrupt the circuit upon reversal of power or current or backfire of the rectifier unit.

Accordingly, a primary object of this invention is to provide a novel dual characteristic fuse.

Another object of this invention is to provide a novel fuse which distinguishes between direction of current flow in its operating characteristics.

A further object of this invention is to provide a novel fuse for the protection of rectifier cells.

Yet a further object of this invention is to provide a novel fuse which is associated with an explosive element which is detonated under predetermined current conditions to operate the fuse link.

These and other objects of my invention will become apparent from the following description when taken in connection with the drawings, in which:

FIGURE 6 is similar to FIGURE 3, and shows the magnetic core within the fuse housing.

FIGURE 7 is similar to FIGURE 5, and shows the magnetic core within the fuse housing.

FIGURE 9 shows a further embodiment of the invention wherein the voltage for operating the explosive cap is the resistive voltage drop across the fuse link.

FIGURE 10 illustrates the current characteristics of the rectifier cells of FIGURE 1 which are to be protected by the fuse.

FIGURE 11 illustrates the magnetic characteristics of the core of the sensing circuit which operates the explosive cap.

Figure 1:
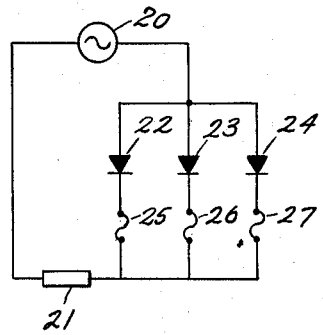
FIGURE 1 illustrates a single phase half-wave rectifier circuit wherein the parallel connected rectifiers of the circuit are each protected by a respective fuse element.

Referring now to FIGURE 1, the rectifier circuit typically shown therein is comprised of an A.-C. source 20 which is connected to a D.-C. load 21 through the parallel connected cells 22, 23 and 24. Each of cells 22, 23 and 24 is connected in series with protective fuses 25, 26 and 27 respectively. Fuse protective circuits of this type have been proposed for rectifiers, and for these further reference is made to U.S. Patent 2,932,781 to Jensen which is assigned to the assignee of the present invention.

The characteristic curve of rectifier cells 22, 23 or 24 is typically shown in FIGURE 10. Referring to FIGURE 10, curve 28 illustrates the forward current as a function of forward voltage for a typical rectifier cell, while curve 29 illustrates reverse voltage as a function of reverse current for a typical cell in good operating order. Note that curve 29 would be on a different current scale than is curve 28.

When the cell is about to fail, its reverse current appreciably increases, as illustrated in curve 30. In accordance with the present invention, in assuming the maximum reverse voltage on cell to be $V_R$, when a maximum reverse current of $I_R$ is reached, it is desired to operate the fuse and thus remove the cell from the system. Clearly, if there is a distinct break-over of the cell, this current $I_R$ will be quickly reached. However, the current $I_R$ will be a very small fraction of the forward current 28 which will normally pass through the fuse and in FIGURE 1 is plotted on a different scale than is the reverse current. Thus, it is necessary somehow to distinguish between these two directions of current flow.

In accordance with the present invention I provide a novel fuse element wherein an explosive cap is operated when the reverse current reaches some predetermined value where the explosive cap causes interruption of the fuse link and operation of the fuse.

Figure 2:
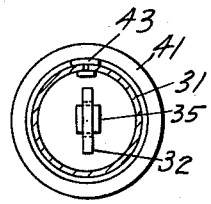
FIGURE 2 is a side cross-sectional view of a fuse constructed in accordance with the present invention and is specifically taken across lines 2—2 of FIGURE 3.
Figure 3:
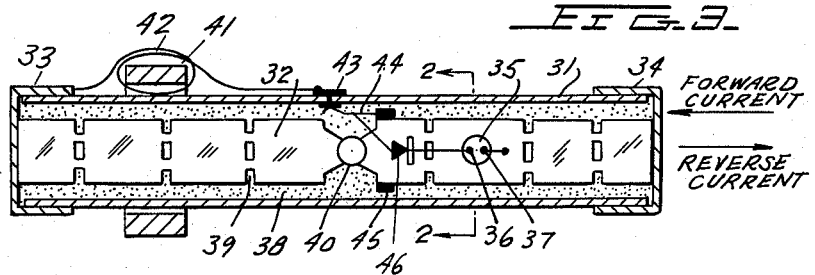
FIGURE 3 is a cross-sectional view of the fuse of the present invention wherein a magnetic core having a multiturn winding is external of the fuse housing and is connectable through a cell to an explosive cap in the fuse link.

A first embodiment of the invention is shown in FIGURES 2 and 3 where the fuse is comprised of an insulated housing 31 which has a fuse link 32 therein. The housing 31 of fuse link 32 is of standard construction, and is terminated by conductive end caps 33 and 34 in the standard manner. The standard fuse link 32 is modified only by the connection of an explosive cap 35 therein which has a pair of terminals 36 and 37 which cause detonation of the cap responsive to a predetermined voltage thereacross. The interior of the fuse may then be filled with any desired medium 38.

The fuse of FIGURES 2 and 3 will thus be seen to operate in the manner of any typical fuse whereby preselected portions of the link will cause fuse operation for very high short circuit currents, while other portions of the fuse will cause operation for prolonged overload currents. By way of example, fuse link portions 39 will operate to cause fuse operation for a high rate of change of current, while fuse portion 40 is specifically adapted to cause fuse operation for prolonged overload currents.

In the present invention, explosive cap 35 is provided so that the fuse link is operated responsive to reverse currents of a predetermined nature. The circuit for initiating operation of cap 35 includes a magnetic core 41 which has a winding 42 thereon. One end of winding 42 is connected to end cap 33, and the other end of winding 42 is connected to a conductive rivet 43 which extends through housing 31. The inner portion of rivet 43 has a flexible conductive spring 44 engaged therewith where spring 44 is carried from insulating support 45 on the link 32. A small rectifier cell 46 has its anode connected to conductive spring 44, and its cathode connected to terminal 36. The terminal 37 of cap 35 is then connected to link 32.

The direction of reverse current and forward current are illustrated in FIGURE 3. During forward current flow, if the current changes, the flux of core 41 changes to induce a voltage in winding 42. This voltage, however, is in the reverse direction of cell 46 so that no potential will fall across terminals 36 and 37 of cap 35. During reverse current flow, the current passing through the fuse link will, when it is below some predetermined condition, be insufficient to supply the magnetizing current for core 41 so that only a negligible voltage is induced in winding 42 which is insufficient to cause operation of cap 35. Small rectifier cell 46 also serves to block the possible by-pass portion of the forward current circuit through the link 32, terminal 37, cap 35, terminal 36, contact pairs 44, 43, winding 42 and end cap 33 if the explosive cap 35 firing element is of the wire-wound type. Under certain conditions, auxiliary diode 46 may be eliminated as where the by-pass current is negligible, core 41 has a square hysteresis loop and low magnetizing current, cap 35 is of the spaced electrode type, and the normal forward current changes from zero to some forward positive value. Note that core 51 should always be flux reset in proper direction (polarized) before assembly of the fuse to avoid firing on first application of the forward current and unwanted pulse in forward direction.

When, however, the cell being protected is faulty, the reverse current as illustrated in FIGURE 10 will increase to the value $I_R$ whereby a complete flux change is possible for core 41 so that a substantial voltage will be applied across terminal 36 and 37. Accordingly, the cap 35 will be detonated and the fuse link will be interrupted.

As is illustrated in FIGURE 6 wherein all components similar to those of FIGURE 3 are given similar identifying numerals, the core 41 may be contained within insulating housing 31, rather than externally thereof as shown in FIGURE 3. In addition, FIGURE 6 shows that the cell 46 of FIGURE 3 can be comprised of a stack of semi-conductor plates 50 which encircle the fuse link 32.

Figure 4:
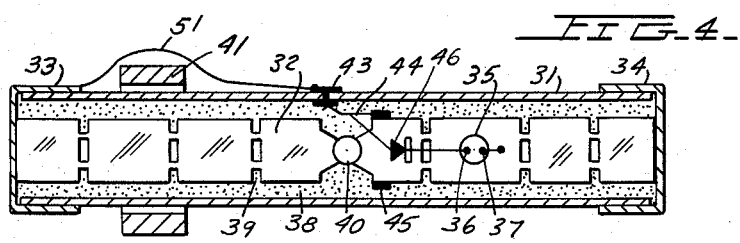
FIGURE 4 shows a modification of FIGURE 3 wherein the magnetic core winding is of the by-pass type.

A further modification of the fuse of FIGURE 3 is shown in FIGURE 4 where similar components have been given like identifying characters, FIGURE 4 illustrating winding 42 of FIGURE 3 as being comprised of a bypass conductor 51.

A modification of the arrangement of FIGURE 4 is shown in FIGURE 8 where magnetic core 41 is contained within insulating housing 31.

As was previously discussed, the novel fuse of the invention may be used in a symmetric circuit to be operable responsive to predetermined current conditions. Thus, in FIGURE 5 the explosive cap 35 may be arranged to be detonated only responsive to a predetermined voltage which is reached only when the output voltage of winding 53 reaches some predetermined value. It will be noted that FIGURE 5 differs from the aforementioned embodiments in that winding 53 is electrically insulated from the remaining fuse circuit, as is the firing wire of the explosive cap 35. Thus, in FIGURE 5 the terminal 37 of cap 35 is electrically connected to winding 53 through a second insulating rivet connection 54 which extends through insulated housing 31. By insulating the firing wire of cap 35 from the fuse link, the operation of the firing wire can be rendered independent of the present existing current through fuse link 32 and will be dependent only on the voltage induced in winding 53.

Figure 5:
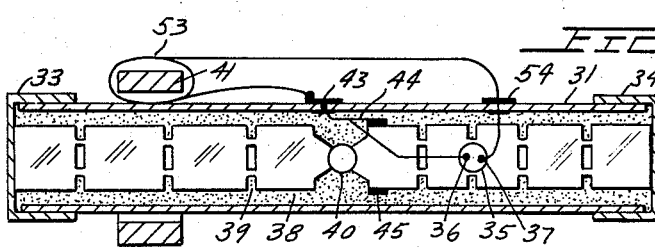
FIGURE 5 is similar to FIGURES 3 and 4, but shows the magnetic core output winding as being an independent winding which is directly connected to the explosive cap in the absence of a rectifier so that the cap is operable on forward current.

FIGURE 7 is similar to FIGURE 5 and illustrates the manner in which core 41 is contained within the fuse housing to eliminate the necessity for conductive rivets 43 and 54.

A further embodiment of the invention set forth in FIGURE 9 illustrates the manner in which the firing circuit is rendered independent of a magnetic circuit. Thus, in FIGURE 9 the energizing circuit for cap 35 includes a conductor 55 which has one end connected to the left-hand end of link 32 and its right-hand end connected to the anode of cell 46. The cathode of cell 46 is connected to terminal 36 of cap 35, and the other terminal 37 of cap 35 is connected to the right-hand link portion, as shown. In this circuit, the voltage drop across the link from point 56 to point 57 is utilized for achieving firing of the cap. That is to say, when current flows in the reverse direction through link 32 and is of a value higher than some predetermined value, the voltage drop will be proportionately increased, and the cap 35 may be fired. When the current through the link is in the forward direction, however, cell 46 blocks the voltage generated between points 56 and 57 to prevent firing of cap 35.

Although I have described preferred embodiments of my novel invention, many variations and modifications will now be obvious to those skilled in the art, and I prefer therefore to be limited not by the specific disclosure herein but only by the appended claims.

I claim:

1. A polarized fuse having operational characteristics dependent upon the direction of current flow through said fuse; said polarized fuse comprising a fuse link contained within a housing; said fuse link having an explodable element connected thereto; said explodable element having a pair of terminals for receiving a detonating electrical signal; and a detonating electrical circuit connected to said pair of terminals; said electrical circuit generating a detonating electrical signal responsive to predetermined electrical characteristics of current through said fuse when in a first direction; said electrical circuit being incapable of generating a detonating electrical signal when current flows through said fuse in a direction opposite said first direction.

2. A polarized fuse having operational characteristics dependent upon the direction of current flow through said fuse; said polarized fuse comprising a fuse link contained within a housing; said fuse link having an explodable element operatively connected thereto; said explodable element having a pair of terminals for receiving a detonating electrical signal; and a detonating electrical circuit connected to said pair of terminals; said electrical circuit generating a detonating electrical signal responsive to predetermined electrical characteristics of current through said fuse when in a first direction; said electrical circuit being incapable of generating a detonating electrical signal when current flows through said fuse in a direction opposite said first direction; said electrical circuit including a saturable type reactor.

3. In combination; a voltage source, a load, a rectifier cell, and a polarized fuse; said voltage source, load, rectifier cell and polarized fuse being connected in series; said a polarized fuse having operational characteristics dependent upon the direction of current flow through said fuse; said polarized fuse comprising a fuse link contained within a housing; said fuse link having an explodable element connected thereto; said explodable element having a pair of terminals for receiving a detonating electrical signal; and a detonating electrical circuit connected to said pair of terminals; said electrical circuit generating a detonating electrical signal responsive to predetermined electrical characteristics of current through said fuse when in a first direction; said electrical circuit being incapable of generating a detonating electrical signal when current flows through said fuse in a direction opposite said first direction; said predetermined electrical characteristic comprising a reverse current through said rectifier cell which is beyond the normal reverse current of said rectifier cell to indicate that said rectifier cell has failed.

4. A polarized fuse having operational characteristics dependent upon the direction of current flow through said fuse; said polarized fuse comprising a fuse link contained within a housing; said fuse link having an explodable element connected thereto; said explodable element having a pair of terminals for receiving a detonating electrical signal; and a detonating electrical circuit connected to said pair of terminals; said electrical circuit generating a detonating electrical signal responsive to predetermined electrical characteristics of current through said fuse when in a first direction; said electrical circuit being incapable of generating a detonating electrical signal when current flows through said fuse in a direction opposite said first direction; said electrical circuit including circuit means connected to said fuse link to generate a voltage in accordance with the current through said fuse and a rectifier cell; said voltage generating means being connected in series with said rectifier cell and said pair of terminals.

5. A polarized fuse having operational characteristics dependent upon the direction of current flow through said fuse; said polarized fuse comprising a fuse link contained within a housing; said fuse link having an explodable element connected thereto; said explodable element having a pair of terminals for receiving a detonating electrical signal; and a detonating electrical circuit connected to said pair of terminals; said electrical circuit generating a detonating electrical signal responsive to predetermined electrical characteristics of current through said fuse when in a first direction; said electrical circuit being incapable of generating a detonating electrical signal when current flows through said fuse in a direction opposite said first direction; said electrical circuit including circuit means connected to said fuse link to generate a voltage in accordance with the current through said fuse and a rectifier cell; said voltage generating means being connected in series with said rectifier cell and said pair of terminals; said circuit means including a saturable reactor surrounding said fuse link.

6. In combination; a voltage source, a load, a rectifier cell, and a polarized fuse; said voltage source, load, rectifier cell and polarized fuse being connected in series; said a polarized fuse having operational characteristics dependent upon the direction of current flow through said fuse; said polarized fuse comprising a fuse link contained within a housing; said fuse link having an explodable element connected thereto; said explodable element having a pair of terminals for receiving a detonating electrical signal; and a detonating electrical circuit connected to said pair of terminals; said electrical circuit generating a detonating electrical signal responsive to predetermined electrical characteristics of current through said fuse when in a first direction; said electrical circuit being incapable of generating a detonating electrical signal when current flows through said fuse in a direction opposite said first direction; said electrical circuit including circuit means connected to said fuse link to generate a voltage in accordance with the current through said fuse and a cell; said voltage generating means being connected in series with said cell and said pair of terminals; said predetermined electrical characteristic comprising a reverse current through said rectifier cell which is beyond the normal reverse current of said rectifier cell to indicate that said rectifier cell has failed.

References Cited in the file of this patent

UNITED STATES PATENTS

| | | |
|---|---|---|
| 2,892,062 | Bruckner et al. | June 23, 1959 |
| 2,921,250 | Swain | Jan. 12, 1960 |
| 2,961,593 | Kozacka | Nov. 22, 1960 |